March 12, 1963 J. A. HAMILTON 3,080,805
PHOTOGRAPHIC APPARATUS

Filed May 26, 1961 5 Sheets-Sheet 1

INVENTOR.
Joel A. Hamilton
BY
Brown and Mikulka
and
Robert E. Corb
ATTORNEYS

March 12, 1963  J. A. HAMILTON  3,080,805
PHOTOGRAPHIC APPARATUS
Filed May 26, 1961  5 Sheets-Sheet 3

INVENTOR.
Joel A. Hamilton
BY
Brown and Mikulka
and
Robert E. Corb
ATTORNEYS

March 12, 1963  J. A. HAMILTON  3,080,805
PHOTOGRAPHIC APPARATUS
Filed May 26, 1961  5 Sheets-Sheet 4

INVENTOR.
Joel A. Hamilton
BY
Brown and Mikulka
Robert E. Corb
ATTORNEYS

United States Patent Office 3,080,805
Patented Mar. 12, 1963

3,080,805
PHOTOGRAPHIC APPARATUS
Joel A. Hamilton, West Medway, Mass., assignor to Polaroid Corporation, Cambridge, Mass., a corporation of Delaware
Filed May 26, 1961, Ser. No. 112,941
26 Claims. (Cl. 95—13)

This invention relates to photographic apparatus and, more particularly, to novel and improved apparatus for processing photographic film units.

In the copending application of Richard R. Wareham, Serial No. 715,370, filed February 14, 1956, there is described a new method of feeding and withdrawing a photographic film unit from apparatus (such as a camera) between a pair of juxtaposed pressure-applying members to effect the distribution of a processing fluid within the film unit. In this method, a leader attached to the film unit is pulled from the apparatus to one side of the pressure-applying members for drawing the leading end of the film unit between the pressure-applying members so that the leading end of the film unit may be grasped for drawing the film unit from the housing between the pressure-applying members. Two primary advantages are noted for this system, the first residing in the fact that it permits a plurality of leaders attached to a plurality of film units to project from the camera (but not between the pressure-applying members) where each leader may be grasped for withdrawing a film unit between the pressure-applying members. This system also requires two separate pulling steps for each film unit, thereby allowing the film unit to properly align itself with respect to the pressure-applying members during and intermediate the two pulling steps.

Objects of the invention are to provide, in photographic apparatus including a housing and a pair of juxtaposed pressure-applying members mounted within said housing adjacent an opening therein, novel and improved means for guiding a leader coupled with a film unit around and to one side of the pressure-applying members from the housing while guiding a leading end portion of said film unit between the pressure-applying members through the opening in response to withdrawal movement of the leader; and to provide in apparatus of the type described means for causing the leader to become detached from the film unit following advancement of the leading end portion of the film unit between the pressure-applying members.

Another object of the invention is to provide guide means of the type described for defining a passage for guiding said leader around said pressure-applying members, which passage will not admit said leading end portion of the film unit.

A further object of the invention is to provide in photographic apparatus of the type described means exterior of the opening in the housing for enclosing portions of the leaders projecting from the housing.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The apparatus of the invention is preferably in the form of a hand-held camera for employing a film pack or magazine comprising a plurality of individual film units. Each film unit includes a photosensitive sheet which is exposed, a second or print-receiving sheet superposed with the exposed photosensitive sheet during processing, and a rupturable container of a processing fluid. Processing of the film unit is effected in the camera by a pair of pressure-applying members, preferably rolls, which engage the film unit as the latter is withdrawn from the camera and distribute a processing fluid from the container in a layer between the photosensitive and print-receiving sheets. Each film unit includes a leader which serves as means, projecting from the camera, to be grasped for pulling the film unit from the camera between the pressure-applying members.

As noted with reference to the above-identified application, the camera is designed to be employed with a plurality of film units and the leaders of all the film units are required to project from the camera so that the leaders may be engaged in succession for withdrawing the film units from the camera between the pressure-applying members. Since it is obviously undesirable to have the leader of one film unit extend between the pressure-applying members while another film unit is being drawn between the pressure-applying members to effect the processing thereof, the leaders of the film units extend around and to one side of both of the pressure-applying members rather than between the pressure-applying members; and each leader provides means for drawing a leading end portion of the film unit, of which it is a part, between the pressure-applying members and from the camera where the leading end portion then may be engaged for drawing the film unit between the pressure-applying members from the camera. Thus, in order to effect the processing of a film unit following exposure of the photosensitive element of that film unit, the leader of the film unit is grasped and pulled from the camera until it becomes detached from the film unit. This serves to advance the leading end of the film unit between the pressure-applying members from the camera where the leading end is engaged for pulling the film unit between the pressure-applying members.

An additional advantage of this system, as noted above, resides in the fact that it provides an opportunity for the film unit to properly align itself with respect to the pressure-applying members. For example, when the pressure-applying members comprise rolls, the film unit, if started between the rolls at an angle, will continue to move between the rolls displaced at that angle so that the film unit may eventually jam within the camera housing or the opening provided therein for withdrawal, resulting in damage to the film unit. In the two-step withdrawal system required by the leader arrangement described, the operator grasps and pulls a leader from the camera until this leader becomes detached from the film unit. The leader can be guided in such a way as to prevent the film unit from being advanced in any but the required direction, that is, perpendicular to the axes of the pressure-applying rolls. The walls of the container in which the film unit is enclosed, together with the housing of the camera, also serve to guide the film unit along a proper path until the leading end of the film unit has passed between the pressure-applying members. When the leader becomes detached from the film unit, the manual pulling force on the film unit is discontinued allowing the film unit further opportunity to properly align itself, since any misaligning force is removed. At this point in the film unit withdrawal operation, only a very slight advance of the film unit is required for engagement between the pressure-applying members such that the alignment of the film unit with respect to the members is fixed and is not subject to change during the remainder of the withdrawal movement. In this way, the opportunity for the operator to cause a misalignment of the film unit is limited to the extent of being almost nonexistent, and proper withdrawal of the film unit is assured.

Reference is now made to FIGS. 1 through 5 of the drawings wherein there are illustrated a film unit and an assemblage of film units in the form of a pack useful in the apparatus of the invention. Each film unit, designated 10, comprises a generally rectangular photosensitive sheet 12 and a second or print-receiving sheet 14. Both of these sheets comprise a support which is opaque to light actinic to the photosensitive material of the photosensitive sheet. This photosensitive material comprises a layer of any of the conventional photographic recording media, gelatino silver halide emulsions being the preferred material, carried on a light-opaque flexible sheet such as paper, organic plastics and the like. The second or print-receiving sheet may merely serve to aid in the distribution of a processing fluid in contact with the photosensitive layer or, in the preferred form of film unit, comprises means for supporting a transfer image formed, for example, by a silver halide diffusion transfer-reversal process. Attached to the leading edge of photosensitive sheet 12 is a leader sheet 16 having a first section 18 at which leader sheet 16 is coupled with the photosensitive sheet. First section 18 is approximately equal in width to the photosensitive sheet and provides means for mounting a rupturable container 22 of processing fluid. Leader sheet 16 also includes a tapered end section 20. Second sheet 14 is mounted on a carrier sheet 24 having an intermediate section 26 approximately equal in width to second sheet 14 and having a generally rectangular opening 28 therein defining the area of the second sheet in which image formation occurs. Second sheet 14 is secured to intermediate section 26 so that the portions of the intermediate section bordering on opening 28 provide a mask for defining the image area and cooperating in spreading of the processing fluid. Carrier sheet 24 includes a leading end section 30 having a tapered end portion 32 similar to tapered end section 20 and secured thereto intermediate the ends of tapered end section 20 and tapered end portion 32 of leading end section 30. Tapered end section 20 and end portion 32 cooperate to define the leading end section of the film unit which is advanced between the pressure-applying members.

Figure 1:
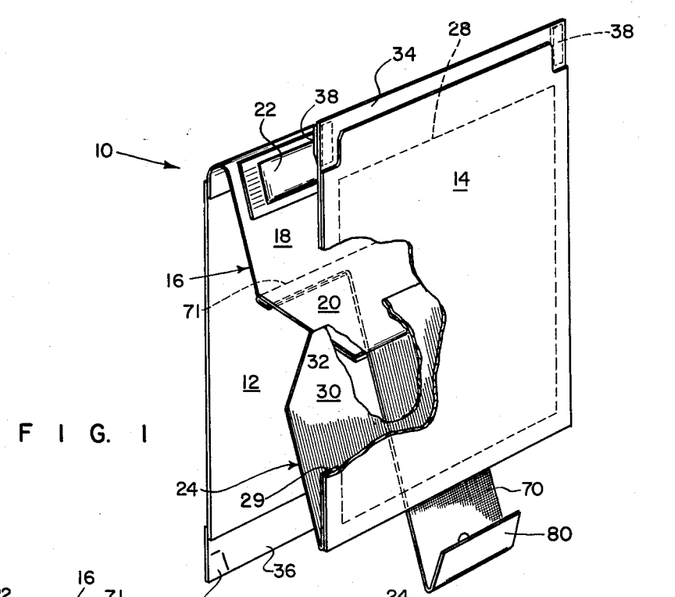
FIGURE 1 is a fragmentary perspective view of a photographic film unit useful in the apparatus of the invention.
Figure 2:
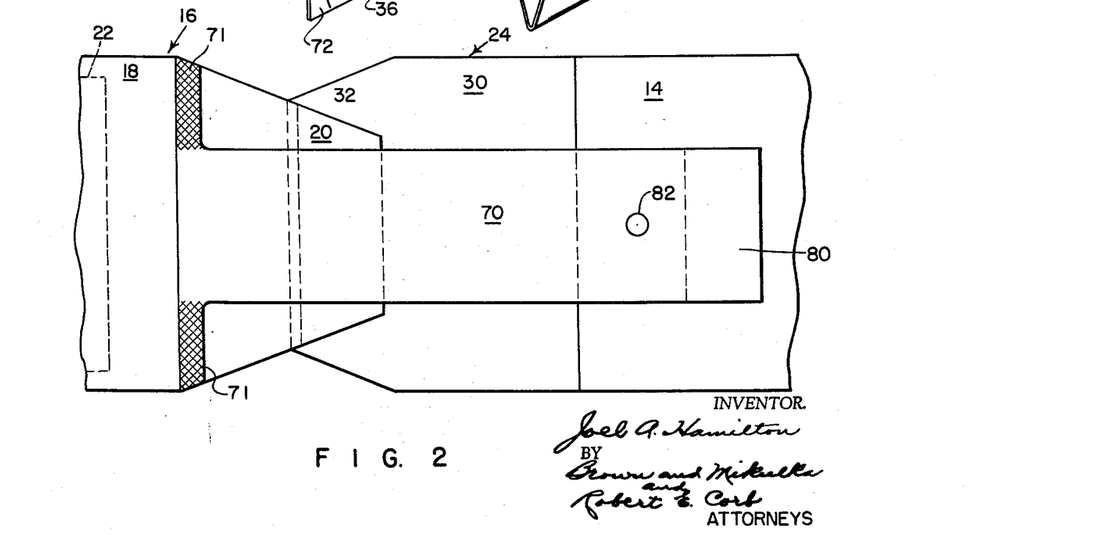
FIG. 2 is a plan view showing in detail portions of the film unit of FIGURE 1.

The length of leader sheet 16 between the leading edge of photosensitive sheet 12 and the point of attachment of the leader sheet to carrier sheet 24 is substantially equal to the length of carrier sheet 24 between its point of attachment to the leader sheet and the leading edge of second sheet 14. It is by virtue of this arrangement that the photosensitive and second sheets are superposed in registered relation during the processing of the film unit. A trailer sheet 36 is provided secured to the trailing edge of photosensitive sheet 12 and cooperates with a trailing end section 34 of carrier sheet 24 which extends beyond the trailing edge of the second sheet, to trap any excess processing fluid which may be carried beyond the trailing ends of the photosensitive and second sheets during distribution of the processing fluid. Distribution of the processing fluid, as noted, is effected by advancing the photosensitive and second sheets and container of processing fluid in superposition relative to and between a pair of juxtaposed pressure-applying members. The members apply compressive pressure to the sheets progressively, commencing in the area of the container, to cause the ejection of the fluid contents of the container between the sheets and the spreading of the fluid in a layer between and in contact with the sheets. To aid in trapping of excess fluid, spacing members 38 are provided on trailing end section 34 adjacent the margins thereof for spacing apart the pressure-applying members to provide a gap between trailing end section 34 and trailer sheet 36 in which any excess processing fluid may be collected and retained.

The rupturable container 22 is of the type shown and described in Patent No. 2,543,181, issued February 27, 1951, in the name of Edwin H. Land, and comprises a rectangular blank of fluid- and air-impervious sheet material folded longitudinally upon itself to form two walls which are sealed to one another along their longitudinal and end margins to form a cavity in which the processing fluid is contained. The longitudinal marginal seal is made weaker than the end seal so as to become unsealed in response to hydraulic pressure generated within the fluid contents of the container by the application of compressive pressure to the walls of the container. Container 22 is mounted on first section 18 of leader sheet 16 with this longitudinal marginal seal directed toward the leading edge of the photosensitive sheet.

The fluid contents of the container are preferably adapted to effect the formation of a transfer image on print-receiving sheet 14 in the area thereof defined by opening 28 in carrier sheet 24. For details concerning the composition of the fluid and materials useful for the photosensitive and print-receiving sheets and the processes performed by such materials, reference may be had to the above-mentioned Patent No. 2,543,181 and to Patent No. 2,662,822, issued December 15, 1953, in the name of Edwin H. Land.

Figure 3:
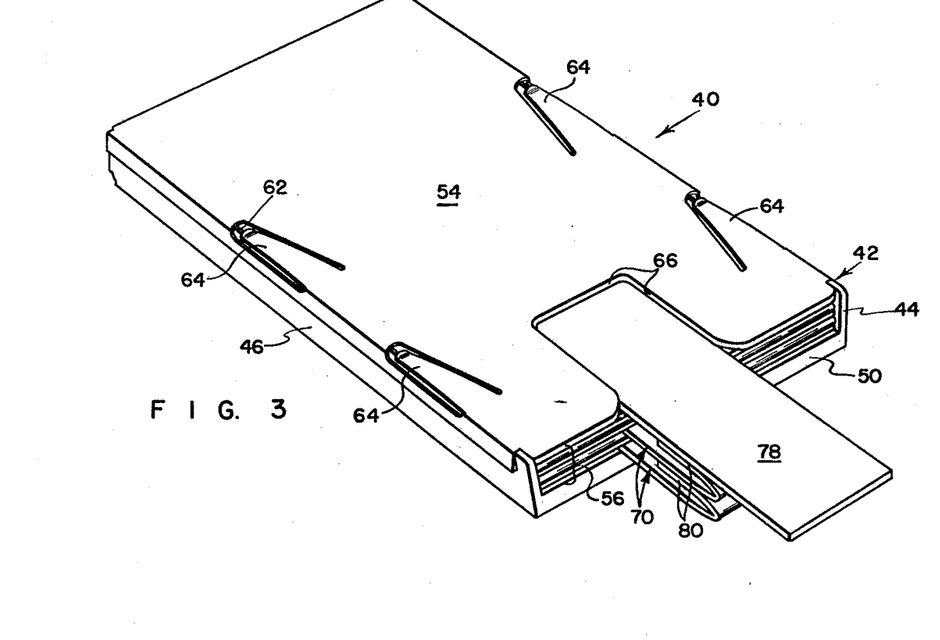
FIG. 3 is a perspective view of a film pack comprising an assemblage of film units.
Figure 5:
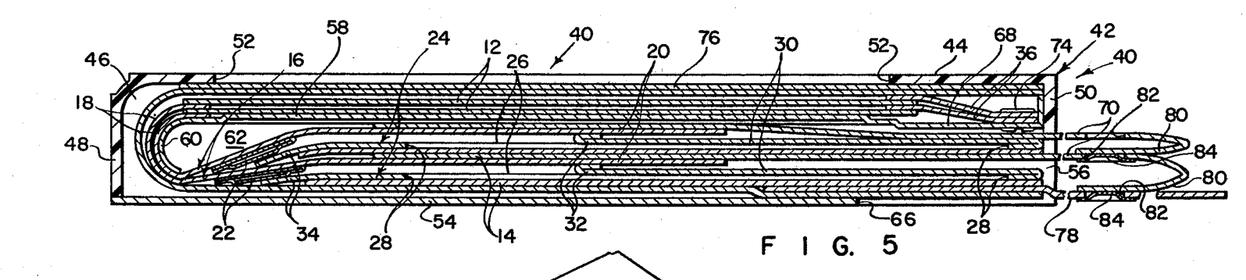
FIG. 5 is a longitudinal sectional view taken substantially midway between the sides of the film pack of FIG. 3.
Figure 7:
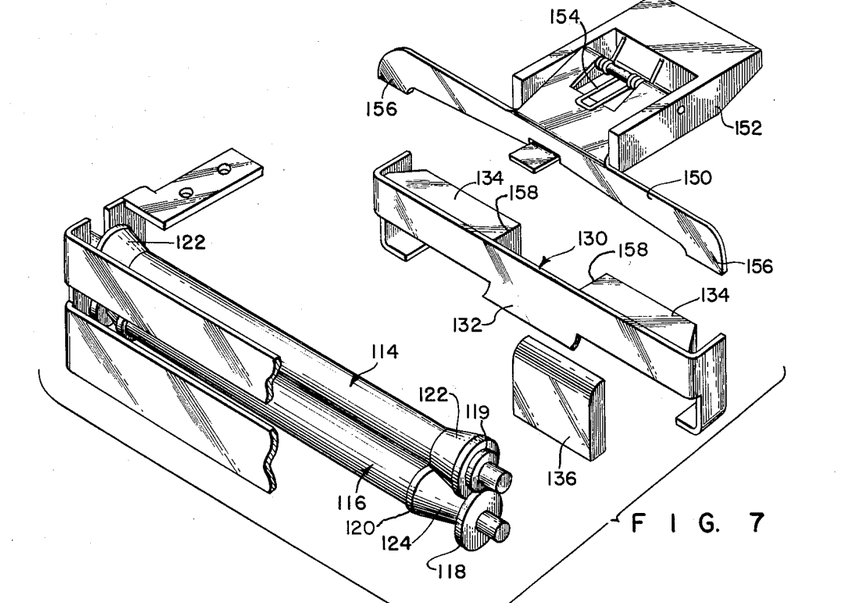
FIG. 7 is an exploded perspective view showing components of the camera of FIG. 6.

A film pack or assemblage of film units 10 is shown in FIGS. 3 and 5 of the drawings. This film pack, designated 40, comprises a generally parallelepiped-shaped container or box 42 for holding and enclosing a plurality of film units 10. Container 42 is shown as comprising two sections, including a forward section having a forward wall 44, side walls 46, a trailing end wall 48, and a leading end wall 50. Forward wall 44 is provided with a generally rectangular exposure aperture 52 for transmitting light for exposing the photosensitive sheets of film units carried within the container. Leading end wall 50 comprises only a partial wall, i.e., it does not extend rearwardly to the same extent as the side walls, which cooperates with the rear section of the container to provide a passage 56 at the leading end of the container through which film units carried by the container are withdrawn. The rear section of the container comprises a rear wall 54 secured to side walls 46 and formed preferably of a resilient sheet metal.

Figures 4, 6:
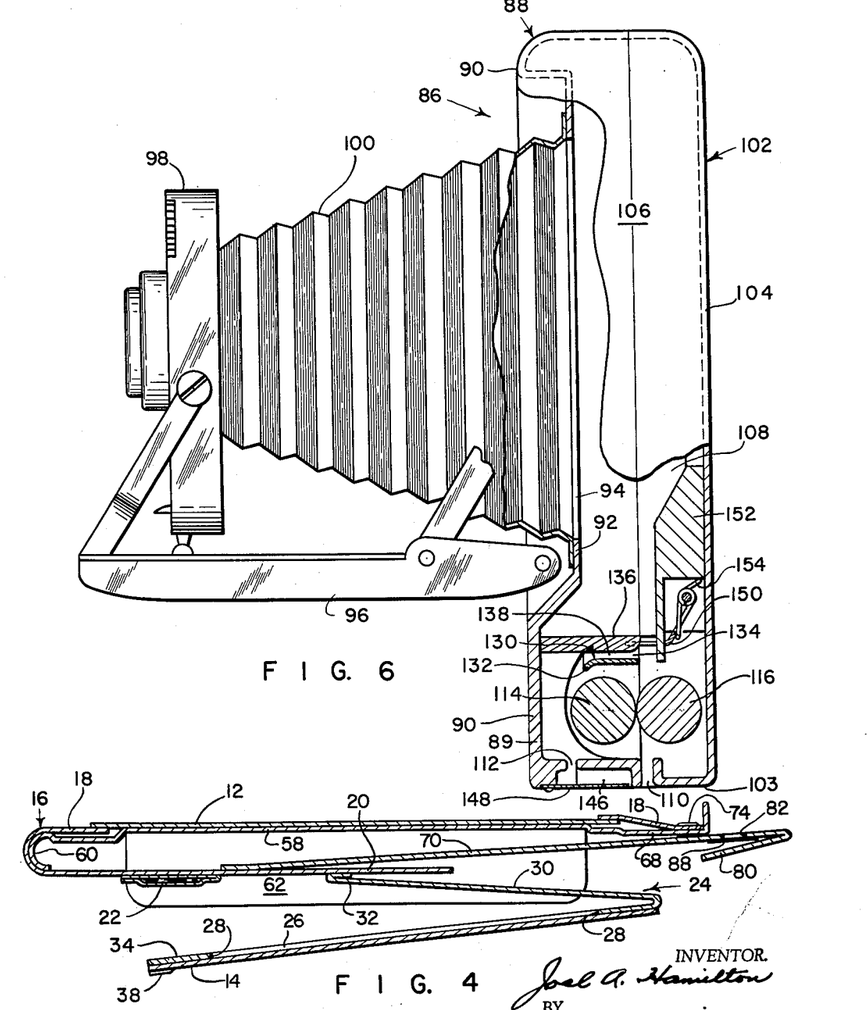
FIG. 4 is a diagrammatic sectional view taken substantially midway between the sides of the film pack showing one film unit with the components thereof spaced apart to more clearly illustrate the construction and arrangement of the film unit.
FIG. 6 is an elevational view, partially in section, of photographic apparatus in the form of a camera embodying the invention.

The arrangement of each film unit within container 42 is illustrated in FIGS. 1, 4 and 5; and the arrangement of a plurality of film units (two are shown) is illustrated in FIG. 5. Each film unit is arranged with the photosensitive and second sheets in overlying relation with the photosensitive surface of the photosensitive sheet facing outward and with the surface of the print-receiving sheet which is superposed therewith, during processing, facing inwardly in the same direction. Leader sheet 16 is folded or curved adjacent the leading edge of photosensitive sheet 12 intermediate that edge and container 22, and carrier sheet 24 is similarly folded adjacent the leading edge of second sheet 14 so that the portions of the leader sheet and carrier sheet which connect the photosensitive and second sheets lie therebetween; and the leading and trailing ends of the photosensitive sheet are disposed adjacent, respectively, the trailing and leading ends of the second sheet. The film pack is provided with a generally flat, rectangular pressure plate 58 located intermediate photosensitive sheet 12 and the other portions of the film unit for supporting the photosensitive sheet against the inner surface of forward wall 44 in position for exposure through aperture 52. Pressure plate 58 includes a rolled end section 60 around which extends the curved portion of leader sheet 16. Rolled end section 60 is provided for guiding photosensitive sheet 12 around the end of the pressure plate in a manner to be described hereinafter. The major portion of first section 18 of leader sheet 16, rupturable container 22 mounted thereon, tapered section 20 and the leading end section 30 of carrier sheet 24 are located behind pressure plate 58 between the latter and second sheet 14. Pressure plate 58 is provided with lateral flanges 62 disposed adjacent side walls 46 of the container. Rear wall 54 of the housing is provided with springs 64 formed from the rear wall and biased inwardly for engaging lateral flanges 62 and biasing pressure plate 58 toward forward wall 44 to retain the photosensitive sheet in position for exposure. Rear wall 54 is also provided with a U-shaped opening or enlarged notch 66 in the end portion thereof adjacent opening 56, the purpose of opening 66 to be described hereinafter.

As a means for withdrawing each film unit from the container with the photosensitive and print-receiving sheets in superposition and advancing tapered end section 20 between a pair of pressure-applying members, each film unit is provided with a relatively narrow elongated leader 70 secured at the trailing end of the leader to tapered end section 20 intermediate first section 18 and the point of attachment of the tapered end section to tapered end portion 32. Leader 70 may be T-shaped, as shown, at its trailing end, with laterally extending arms 71 at which the leader is adhered to the tapered end section in the area designated by the cross-hatching in FIG. 2. Leader 70 extends from container 42 through opening 56 therein and, when drawn from the container, advances a photosensitive sheet 12 around rolled end section 60 of pressure plate 58 into superposition with a second sheet 14 and then advances the two sheets in superposition within the container towards opening 56. As leader 70 commences to advance towards opening 56, tapered end portion 32 of carrier sheet 24 is required to break and commence rolling upon itself toward the opening in response to movement of tapered end section 20 of leader sheet 16 toward the same opening. It is for this reason that section 20 and portion 32 are tapered, since tapering provides for the weakest portion of end portion 32 in the area where the end portion is required to commence rolling. Means are also provided for preventing movement of photosensitive sheets underlying the foremost photosensitive sheet as the latter is moved from exposure position around the end of the pressure plate. This means comprises an end section 68 of pressure plate 58 to which are attached corner portions 72 of trailing end sections 34. Corner portions 72 are precut to insure separation from the remainder of trailing end section 34 and may be secured to end section 68 of the pressure plate by suitable means such as staples 74.

Film pack 40 is provided with means for initially sealing aperture 52 against the admission of light until the pack has been loaded into the camera in which it is to be employed. This light-sealing means comprises a cover sheet 76 (double) of a light-impervious material located between the foremost photosensitive sheet and forward wall 44 across opening 52. Cover sheet 76 extends around the curved end of the pressure plate behind the latter to a position against rear wall 54 with the leading end of the cover sheet located adjacent passage 56. An elongated leader 78, similar to leader 70, is secured to cover sheet 76 at a position thereon spaced inwardly from the leading end of the cover sheet to provide means for withdrawing cover sheet 76 from container 42 after the container has been loaded into a camera.

The apparatus of the invention is illustrated in FIG. 6 in the form of a hand-held camera designated 86, comprising a housing including a forward section 88 having a forward wall 90 with a recessed or reentrant section 92 and an aperture 94 in the reentrant section for transmitting light for exposing the photosensitive sheets of a film pack positioned for exposure within the camera. A hinged door 96 is provided for covering recessed section 92 and for mounting a conventional lens and shutter assembly 98, the latter being connected to recessed section 92 by a collapsible bellows 100 secured at one end to the lens and shutter assembly and secured at its other end to the recessed section in surrounding relation to aperture 94. In lieu of door 96, lens and shutter assembly 98 and bellows 100, the camera housing can be constructed in the form of a camera back or film pack adapter intended to be mounted on or coupled with a camera or other photographic exposure device.

The camera housing includes a rear section 102 having a rear wall 104 and side walls 106 cooperating with forward housing section 88 to provide a chamber 108 to the rear of forward wall 90 and aperture 94 for containing the film pack in position for exposure through aperture 94. Film pack 40 is mounted within chamber 108 with the wall of the pack located against the rear surface of reentrant section 92 and with aperture 52 in the forward wall of the pack aligned with aperture 94. Rear housing section 102 is preferably pivotably secured to forward housing section 88 adjacent one end of the housing, herein shown and designated for purposes of description as the upper end, by a hinge which permits the two housing sections to be moved apart from one another to allow loading of a film pack into chamber 108. The camera housing includes a lower end wall comprising end wall 89 on forward housing section 88 and another end wall 103 on rear housing section 102. A film withdrawal passage 110 is provided in lower end wall 103 of the housing to permit withdrawal of a film unit from the housing. Suitable latch means (not shown) of a conventional type are also provided in the lower portion of the housing for retaining the two housing sections together in the closed or operative position shown in the drawings.

Camera 86 includes a pair of juxtaposed pressure-applying members in the form of pressure-applying rolls 114 and 116 mounted within chamber 108 adjacent film withdrawal passage 110. Pressure-applying rolls 114 and 116 are mounted for pivotal movement with their axes substantially in a common plane, and resilient means are provided for biasing the rolls toward one another into juxtaposition so as to apply compressive pressure to a film unit during movement thereof between the rolls. The pressure-applying rolls cooperate to form a convergent (and divergent) passage through which the film unit is moved for effecting the processing of the film unit, and this passage between the pressure-applying rolls is located in substantial alignment with withdrawal passage 110. In the arrangement of the pressure-applying rolls shown in the drawings, both rolls are mounted on rear housing section 102 so that when the housing sections are pivoted apart from one another, an assemblage of film units may be loaded into the camera with the leaders thereof extending from the camera past and to one side (forward) of the pressure-applying rolls. Portions of end walls 89 and 103 cooperate to define an opening 112 between the forward and rear housing sections through which the leaders extend from the camera housing.

In the form of pressure-applying rolls shown in the drawings, roll 116 is provided with a disc-shaped flange 118 at each end adapted to engage an end section 119 of reduced diameter on roll 114 for spacing the rolls a predetermined minimum distance apart to permit advancement of the leading end section of a film unit between the rolls. The intermediate sections of the rolls which cooperate to spread the processing fluid are substantially cylindrical and of uniform diameter throughout their lengths. The intermediate, uniform-diameter section of roll 114 has a length exceeding the width of opening 28 in intermediate section 26 of carrier sheet 24. The uniform-diameter, intermediate section of roll 116 is slightly shorter but nevertheless exceeds the width of opening 28 and is provided at its ends with short sections or collars 120, each of which has a diameter slightly in excess of the diameter of the intermediate section of roll 116. This difference in diameter is on the order of a few thousandths of an inch and is provided for the purpose of spacing the intermediate sections of the rolls apart from one another by a predetermined amount to provide a space between the photosensitive and second sheets in which the processing fluid is distributed. Collars 120 are supported on the marginal portions of the photosensitive sheet overlying the marginal portions of intermediate section 26 of carrier sheet 24 bordering opening 28 so that the depth of the space between the photosensitive and second sheet and the thickness of the layer of fluid spread therein, is a function of the diameter of collars 120 and the thickness of the carrier sheet.

The pressure-applying rolls also include means for preventing the processing fluid from escaping between the lateral margins of the sheets as the fluid is being spread therebetween. In the form shown, this means comprises outwardly flared sections 122 adjacent the ends of roll 114. Roll 116 is provided with tapered sections 124 adjacent its ends. The flared and tapered sections may be conic and are generally congruent with one another. The flared and tapered sections engage the marginal portions of the photosensitive and second sheets and impart bending stresses to these marginal portions tending to urge the inner adjacent surfaces of the marginal portions of the sheets against one another and prevent the escape of processing fluid from between the edges of the sheets. This bending stress is applied in such a way as to be transmitted to portions of the sheets prior to movement of those portions into engagement with and between the pressure-applying members, and this serves to prevent escape of the fluid from between the margins of the sheets as the sheets enter the convergent passage between the pressure-applying rolls.

Camera 86 includes means for guiding tapered end section 20 of film unit 10 between pressure-applying rolls 114 and 116 in response to withdrawal movement of leader 70 past roll 114 to the front thereof and through opening 112. In the form shown in FIGS. 6 through 9, this guide means comprises a guide bar 130 mounted on rear housing section 102 closely adjacent roll 114 and having a substantially straight rear edge extending from side to side of the camera housing and lying substantially in a plane through the convergent passage between pressure-applying rolls 114 and 116, i.e., tangent to the rolls. An intermediate section 132 of guide bar 130, comprising the forward edge of the guide bar and approximately equal in length to the width of leader 70, is curved toward roll 114 and is located with its forwardmost edge approximately in line with the forwardmost portion of roll 114. A pair of guide members 134 are mounted on the end sections of guide bar 130 adjacent intermediate section 132. The rear surfaces of guide members 134 are located in the plane of the rear edge of guide bar 130 and the two members are provided with facing end surfaces spaced from one another by a distance slightly greater than the width of leader 70. A guide plate 136 approximately equal in length to the width of leader 70 is mounted on forward housing section 88 and extends toward the rear of the camera intermediate guide members 134 adjacent guide bar 130. The rearmost edge of guide plate 136 may be curved, as shown, and is located substantially in the plane of the rear edge of guide bar 130 and rear surfaces of guide members 134. Intermediate section 132 of guide bar 130, guide members 134 and guide plate 136 cooperate with one another to define a guide passage 138 extending generally in a direction from front to rear of the camera and having a width, measured from side to side of the camera, just slightly greater than the width of leader 70, so that the leader may be moved through passage 138. It will be noted that tapered end section 20, at the leading edge thereof, is wider than leader 70 so that tapered end section 20 is unable to enter passage 138. The rear edges of guide bar 130 and guide plate 136 and the rear surfaces of guide members 134 function to support and guide tapered end section 20 of the film unit into the convergent passage between pressure-applying rolls 114 and 116.

In the loading and operation of the camera, the forward and rear housing sections are pivoted apart from one another and a film pack 40 is positioned within the forward housing section with the forward wall of the pack resting against section 92 of the forward wall of forward housing section 88, and with leaders 70 and leader 78 projecting from the pack extending across and to the rear of guide plate 136 and end wall 89. Rear housing section 102 is then pivoted into the operative position shown, causing the intermediate section 132 of guide bar 130 to engage the leaders displacing them forwardly so that they extend through passage 138 toward the forward wall of the camera, past pressure-applying roll 114 and through opening 112 in end wall 89. As a leader 70 is withdrawn from the camera through opening 112, tapered end section 20 is withdrawn from the pack and, being unable to enter passage 138, is guided by the guide bar, guide members and guide plate into the convergent passage between the pressure-applying rolls. Leader 70 is pulled from the camera until it and tapered end section 20 are in the positions shown in FIG. 10, at which portions of leader 70 are subjected to a shearing or tearing force where they join other portions (designated by cross-hatching in FIG. 2) of the leader adhered to tapered end section 20. Continued pulling on the leader causes it to tear away from the tapered end section so that the leader does not interfere with withdrawal of the film unit between the pressure-applying rolls.

The guide means of the invention also cooperate to perform the additional function of promoting tearing of leader 70 at arms 71 during withdrawal movement of each leader from the camera. It will be noted in the drawings, particularly in FIG. 10, that leader 70 is pulled between guide members 144 (or guide members 134 in FIGS. 6 through 8), but arms 71 are unable to move between the guide members. The guide members include rear facing edges 158 at the junctures of their rear and inner facing surfaces against which arms 71 are drawn during withdrawal of the leaders, tending to promote the tearing of the arms from the leaders.

Prior to exposing a film unit and withdrawing the film unit from the camera between the pressure-applying rolls to effect its processing, cover sheet 76 is withdrawn by pulling leader 78 through opening 112 until leader 78 becomes detached from the cover sheet thereby advancing the leading end portion of the cover sheet between the pressure-applying rolls and through opening 110 where the cover sheet may be grasped for withdrawing it from the camera.

Figure 8:
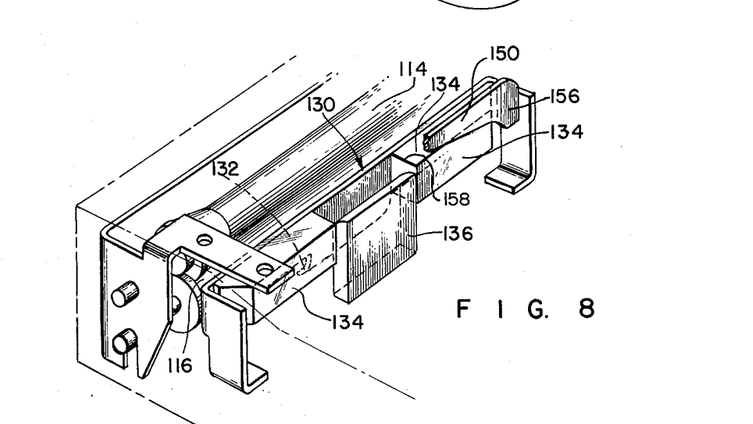
FIG. 8 is a fragmentary perspective view of a portion of the camera.
Figure 9:
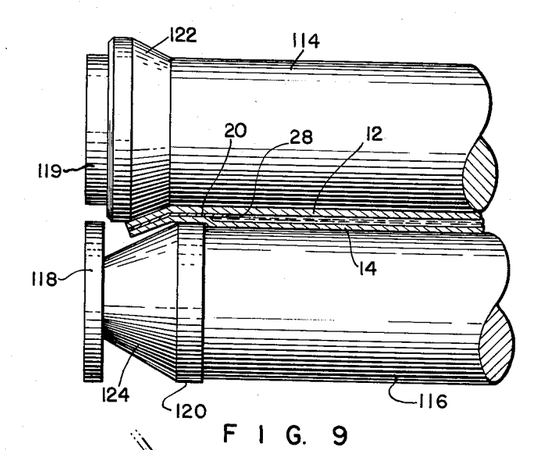
FIG. 9 is a fragmentary sectional view of components of the camera.
Figure 10:
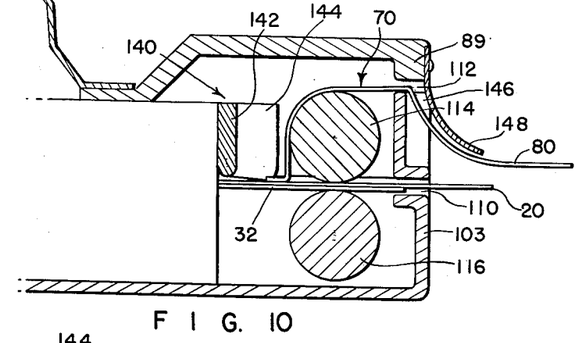
FIG. 10 is a fragmentary sectional view similar to FIG. 6 illustrating another embodiment of the camera.
Figure 11:
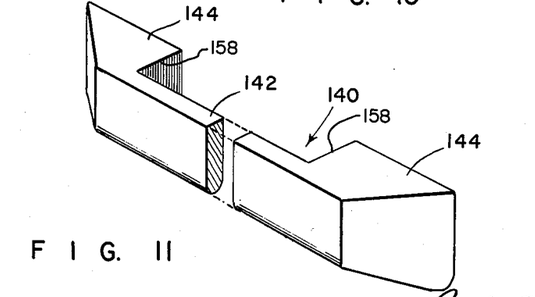
FIG. 11 is a perspective view showing a component of the camera of FIG. 10.

Another form of guide means, designated 140, embodying the invention, is illustrated in FIGS. 10 and 11 of the drawings. Guide means 140 is similar in construction to the guide means shown in FIGS. 6 through 8 and comprises a guide bar 142 and two guide members 144. The guide bar and guide members of guide means 140 are shown as comprising portions of a single element, it being understood that the guide bar and guide members may comprise three separate elements, as shown in FIG. 8; and in the alternative, guide bar 130 and guide members 134 may be formed as a single element similar to guide means 140. Guide means 140 is mounted on forward housing section 88 adjacent forward roll 114 with the rearmost surfaces of guide members 144 disposed approximately in a plane tangent to the surfaces of rolls 114 and 116. The spacing between the facing surfaces of guide members 144 is slightly greater than the width of leader 70 but less than the narrowest portion of tapered end section 20 so that leader 70 may pass between guide members 144 while tapered end section 20 is supported on and guided by members 144 between the pressure-applying rolls. The intermediate section of guide bar 142 and guide members 144 cooperate with one another and roll 114 to define what may be termed a passage through which leader 70 is guided to the front of roll 114 and through opening 112.

Film withdrawal passage 110, in the lower end wall of the camera housing, is at least equal in width to the width of the film unit, whereas opening 112 need be of a width only sufficient to allow the passage of leader 70. It is desirable to allow only one leader at a time to project from the camera where the leader may be grasped; and this is desirable to prevent the operator from accidentally pulling the wrong leader, or pulling more than one leader at a time. For this purpose, end wall 103 is provided with a recess, designated 146, adjacent passage 112 for holding the leading end sections of leaders 70. The leading end sections, designated 80, of leader 70, are folded back upon themselves and each leading end section is detachably adhered to the leader of the preceding film unit, with the leading end section 80 of the first (to be exposed) film unit being attached to leader 78. The folded leading end sections 80 of leaders 70 are contained within recess 146 which is provided with a resilient cover element 148. As leader 78 or a leader 70 is withdrawn through opening 112, the leading end section 80 of the next succeeding leader 70 is unfolded and withdrawn from recess 146 where the leading end section may be grasped for pulling the leader from the camera. By virtue of this arrangement, only one leader at a time extends outside of recess 146 in position to be engaged and withdrawn. A convenient means for detachably securing each leading end section 80 to the previous leader is shown and comprises providing an opening 82 in each leader 70 adjacent leading end section 80 thereof and in leader 78. A piece of pressure-sensitive adhesive tape is secured to the leader across opening 82 so that the adhesive surface of the tape will contact the leading end section 80 of the next succeeding leader through opening 82.

As a photosensitive sheet 12 is being drawn within the pack around curved end 60 of the pressure plate into superposed relation with a second sheet 14, the second sheet tends to move due, for example, to friction between the various sheet materials. Means are provided in the camera for restraining the second sheets 14 against such movement and, in the form shown, comprise an elongated bar 150 pivotally mounted intermediate its ends in a housing 152 mounted on rear wall 104 within chamber 108. Bar 150 is biased by a spring 154 into a forward position with the end sections 156 of bar 150 extending forwardly across the end portions of withdrawal passage 56 in container 42 toward and into engagement with guide members 134. End sections 156, in this position, engage the leading edges of second sheets 14 adjacent the sides thereof for preventing movement of the second sheets toward the pressure-applying rolls. Spring 154 is of sufficient strength to resist the relatively small force exerted by the second sheets due to frictional engagement with the other sheets, but permits bar 150 to be pivoted rearwardly sufficiently to allow the withdrawal of a second sheet 14 when the latter is pulled from container 42 in superposition with a photosensitive sheet 12. The U-shaped opening 66 in rear wall 54 (mentioned earlier) is provided to accommodate housing 152, a portion of which extends into container 42 through opening 66.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for processing a photographic film unit including a leading end section and an elongated leader which is narrower than said leading end section and is attached thereto at a location thereon spaced from the leading edge of said leading end section toward the opposite end of said film unit, said apparatus comprising, in combination, a housing for enclosing said film unit; a pair of juxtaposed pressure-applying members mounted within said housing for applying compressive pressure to said film unit during movement thereof between said members, said pressure-applying members including portions providing a convergent passage between said members; guide means within said housing for guiding said leading end section into said convergent passage between said pressure-applying members, said guide means providing a passage having a width sufficient to admit said leader and insufficient to admit said leading end section for guiding said leader around said pressure-applying members; and portions of said housing defining at least an opening in said housing adjacent said pressure-applying members on the side thereof opposite said guide means for allowing withdrawal movement of said film unit from said housing.

2. The photographic apparatus of claim 1 wherein said housing includes portions defining a pair of adjacent openings in said housing disposed to the side of said pressure-applying members opposite said guide means, one of said openings being located in alignment with said passage between said pressure-applying members for permitting withdrawal movement of said film unit from said housing, the other of said openings being constructed and located for permitting withdrawal movement of said leader around said pressure-applying members from said housing.

3. Photographic apparatus for processing a photographic film unit including a leading end section and an elongated leader which is narrower than said leading end section and is attached thereto at a location thereon spaced from the leading edge of said leading end section toward the opposite end of said film unit, said apparatus comprising, in combination, a housing for enclosing said film unit; a pair of juxtaposed pressure-applying members mounted within said housing for applying compressive pressure to said film unit during movement thereof between said members, said pressure-applying members including portions providing a convergent passage between said members; guide means positioned within said housing adjacent one of said pressure-applying members for guiding said leading end section into said convergent passage, said guide means cooperating with said one pressure-applying member to provide a guide passage through which said leader is moved around said pressure-applying members, said guide passage having a width sufficient to admit said leader and insufficient to admit said leading end section; and portions of said housing defining at least an opening in said housing adjacent said pressure-applying members on the side thereof opposite said guide means for allowing withdrawal movement of said film unit from said housing.

4. Photographic apparatus for processing a photographic film unit including a leading end section and an elongated leader attached to said leading end section at a location thereon spaced from the leading edge of said leading end section toward the opposite end of said film unit, said apparatus comprising, in combination, a housing for enclosing said film unit, said housing including a pair of sections movable relative to one another to permit positioning of said film unit within said housing; a pair of juxtaposed pressure-applying members mounted within said housing on one of said housing sections for applying compressive pressure to said film unit during movement thereof between said members, said pressure-applying members including portions providing a passage between said members; guide means within said housing for guiding said leading end section into said passage between said pressure-applying members and guiding said leader around said pressure-applying members toward an opening in said housing adjacent said pressure-applying members on the side thereof opposite said guide means; and portions of said housing defining a pair of adjacent openings in said housing disposed to the side of said pressure-applying members opposite said guide means, one of said openings being provided in said one housing section in alignment with said passage between said pressure-applying members for permitting withdrawal movement of said film unit from said housing, the other of said openings being located between and defined by portions of both of said housing sections for permitting positioning of said film unit within said housing with said leader extending through said other opening.

5. Photographic apparatus as defined in claim 4 for use with a film unit wherein said leader is substantially narrower than said leading end section, said other opening being substantially narrower than said one opening.

6. The photographic apparatus of claim 5 wherein portions of said housing defining said other opening are provided with a recess in the region of said opening for holding an end portion of said leader, and movable cover means are provided on said housing for covering said recess and enclosing the portion of said leader held therein.

7. Photographic apparatus for processing a photographic film unit including a leading end section and an elongated leader which is narrower than said leading end section and is attached thereto at a location thereon spaced from the leading edge of said leading end section toward the opposite end of said film unit, said apparatus comprising, in combination, a housing for enclosing said film unit; a pair of juxtaposed pressure-applying members mounted within said housing for applying compressive pressure to said film unit during movement thereof between said members, said pressure-applying members including portions providing a convergent passage between said members; first guide means mounted within said housing for guiding said leading end section of said film unit into alignment with said convergent passage; second guide means mounted within said housing, said second guide means including means located between said first guide means and said pressure-applying members for guiding said leading end section into said convergent passage between said pressure-applying members, and means cooperating with said first guide means to define a guide passage, having a width sufficient to admit said leader and insufficient to admit said leading end section, for guiding said leader around said pressure-applying members; and portions of said housing defining at least an opening in said housing adjacent said pressure-applying members on the side thereof opposite said guide means for allowing the withdrawal movement of said film unit from said housing.

8. The photographic apparatus of claim 7 wherein said housing includes portions defining a pair of adjacent openings in said housing disposed to the side of said pressure-applying members opposite said guide means, one of said openings being located in alignment with said passage between said pressure-applying members for permitting withdrawal movement of said film unit from said housing, and the other of said openings being constructed and located for permitting withdrawal movement of said leader around said pressure-applying members from said housing.

9. The photographic apparatus of claim 8 wherein said portions of said housing defining said other opening provide a recess in the region of said opening for holding an end portion of said leader, and a movable cover means is provided on said housing for covering said recess and enclosing the portion of said leader held therein.

10. Photographic apparatus for processing a photographic film unit including a leading end section and an elongated leader which is narrower than said leading end section and is attached thereto at a location thereon spaced from the leading edge of said leading end section toward the opposite end of said film unit, said apparatus comprising, in combination, a housing for enclosing said film unit, said housing including a pair of sections movable relative to one another to permit positioning of said film unit within said housing; a pair of juxtaposed pressure-applying members mounted within said housing on one of said housing sections for applying compressive pressure to said film unit during movement thereof between said members, said pressure-applying members including portions providing a convergent passage between said members; first guide means mounted within said housing on the other of said housing sections for guiding said leading end of said film unit into alignment with said convergent passage; second guide means mounted within said housing on said one housing section, said second guide means including means located between said first guide means and said pressure-applying members for guiding said leading end section into said convergent passage between said pressure-applying members, and means cooperating with said first guide means to define a guide passage for guiding said leader around said pressure-applying members toward an opening in said housing adjacent said pressure-applying members on the side thereof opposite said guide means, said guide passage having a width sufficient to admit said leader and insufficient to admit said leading end section; and portions of said housing defining an opening in said housing adjacent said pressure-applying members on the side thereof opposite said guide means for allowing the withdrawal movement of said film unit from said housing.

11. The photographic apparatus of claim 10 wherein said housing includes portions defining a pair of adjacent openings in said housing, disposed to the side of said pressure-applying members opposite said guide means, one of said openings being located in alignment with said passage between said pressure-applying members for permitting withdrawal movement of said film unit from said housing, and the other of said openings being constructed and located for permitting withdrawal movement of said leader around said pressure-applying members from said housing.

12. The photographic apparatus of claim 11 wherein said one opening is defined by portions of said one housing section, and said other opening is located between and defined by portions of both of said housing sections.

13. The photographic apparatus of claim 11 wherein said portions of said housing defining said other opening provide a recess in the region of said opening for holding an end portion of said leader, and a movable cover means is provided on said housing for covering said recess and enclosing the portion of said leader held therein.

14. Photographic apparatus for processing a photographic film unit including a leading end section and an elongated leader which is narrower than said leading end section and is attached thereto at a location thereon spaced from the leading edge of said leading end section toward the opposite end of said film unit, said apparatus comprising, in combination, a housing for enclosing said film unit, said housing including a pair of sections movable relative to one another to permit positioning of said film unit within said housing; a pair of juxtaposed pressure-applying members mounted within said housing on one of said housing sections for applying compressive pressure to said film unit during movement thereof between said members, said pressure-applying members including portions providing a convergent passage between said members; guide means mounted within said housing on the other of said housing sections adjacent the one of said pressure-applying members closest said one housing section for guiding said leading end section into said convergent passage, said guide means cooperating with said one pressure-applying member to provide a guide passage through which said leader is moved around said pressure-applying members between said one pressure-applying member and said one housing section, said guide passage having a width sufficient to admit said leader and insufficient to admit said leading end section; and portions of said housing defining an opening in said housing adjacent said pressure-applying members on the side thereof opposite said guide means for allowing the withdrawal movement of said film unit from said housing.

15. Photographic apparatus for processing a photographic film unit including a leading end section and an elongated leader which is narrower than said leading end section and is attached thereto at a location thereon spaced from the leading edge of said leading end section toward the opposite end of said film unit, said apparatus comprising, in combination, a housing for enclosing said film unit, said housing including a pair of sections movable relative to one another to permit positioning of said film unit within said housing; a pair of juxtaposed pressure-applying members mounted within said housing on one of said housing sections for applying compressive pressure to said film unit during movement thereof between said members, said pressure-applying members including portions providing a convergent passage between said members; first guide means mounted within said housing on the other of said housing sections for guiding said leading end of said film unit into alignment with said convergent passage; second guide means mounted within said housing on said one housing section between said first guide means and said pressure-applying members for guiding said leading end section into said convergent passage between said pressure-applying members; and third guide means mounted on one of said housing sections and cooperating with said first and second guide means to define a guide passage having a width sufficient to admit said leader and insufficient to admit said leading end section for guiding said leader around said pressure-applying members toward an opening adjacent the side of said pressure-applying members opposite said guide means, said third guide means including portions for engaging and guiding said leading end section toward said convergent passage; and portions of said housing defining at least an opening in said housing adjacent said pressure-applying members on the side thereof opposite said guide means for allowing the withdrawal movement of said film unit from said housing.

16. The photographic apparatus of claim 15 wherein said housing includes portions defining a pair of adjacent openings in said housing disposed to the side of said pressure-applying member opposite said guide means, one of said openings being located in alignment with said passage between said pressure-applying members for permitting withdrawal movement of said film unit from said housing, and the other of said openings being constructed and located for permitting withdrawal movement of said leader around said pressure-applying members from said housing.

17. The photographic apparatus of claim 16 wherein said one opening is defined by portions of said one housing section, and said other opening is located between and defined by portions of both of said housing sections.

18. The photographic apparatus of claim 16 wherein said portions of said housing defining said other opening provide a recess in the region of said opening for holding an end portion of said leader, and a movable cover means is provided on said housing for covering said recess and enclosing the portion of said leader held therein.

19. Photographic apparatus for processing a photographic film unit including a leading end section and an elongated leader which is narrower than said leading end section and is attached thereto at a location thereon spaced from the leading edge of said leading end section toward the opposite end of said film unit, said apparatus comprising, in combination, a housing for enclosing said film unit, said housing including a pair of sections movable relative to one another to permit positioning of said film unit within said housing; a pair of juxtaposed pressure-applying members mounted within said housing on one of said housing sections for applying compressive pressure to said film unit during movement thereof between said members, said pressure-applying members including portions providing a convergent passage between said members; first guide means mounted within said housing on the other of said housing sections for guiding said leading end of said film unit into alignment with said convergent passage; second guide means mounted within said housing on said one housing section, said second guide means including a first guide portion cooperating with said first guide means to define a guide passage, having a width sufficient to admit said leader and insufficient to admit said leading end section, for guiding said leader around said pressure-applying members toward an opening in said housing located to the side of said pressure-applying members opposite said guide means, said second guide means including second guide portions for engaging said leading end section to guide the latter into said convergent passage between said pressure-applying members; and portions of said housing defining at least an opening in said housing adjacent said pressure-applying members on the side thereof opposite said guide means for allowing the withdrawal movement of said film unit from said housing.

20. Photographic apparatus for exposing and processing a photographic film unit which includes a leading end section and an elongated leader attached thereto at a location thereon spaced from the leading edge of said leading end section toward the opposite end of said film unit, said apparatus comprising, in combination, a housing for enclosing said film unit, said housing including forward and rear sections movable relative to one another to permit positioning of said film unit within said housing; exposure means mounted on said forward housing section; said forward housing section including means for positioning said film unit for exposure; a pair of juxtaposed pressure-applying members mounted within said housing on said rear housing section for applying compressive pressure to said film unit during movement thereof between said members, said pressure-applying members including portions providing a convergent passage between said members; guide means within said housing for guiding said leading end section into said passage between said pressure-applying members and guiding said leader forward of said pressure-applying members toward an opening in said housing adjacent said pressure-applying members on the side thereof opposite said guide means; a portion of said rear housing section defining an opening therein disposed to the side of said pressure-applying members opposite said guide means and located in alignment with said convergent passage for permitting withdrawal movement of said film unit between said pressure-applying members from said housing; and portions of said forward and rear housing sections defining a second opening located adjacent and forward of the first-mentioned opening for permitting withdrawal movement of said leader from said housing, said second opening being located between said forward and rear housing sections to permit positioning of said film unit within said housing with said leader extending through said second opening.

21. Photographic apparatus for processing a photographic film unit including a leading end section and an elongated leader which is narrower than said leading end section and is attached thereto at a location thereon spaced from the leading edge of said leading end section toward the opposite end of said film unit, said apparatus comprising, in combination, a housing for enclosing said film unit, said housing including forward and rear sections movable relative to one another to permit positioning of said film unit within said housing; exposure means mounted on said forward housing section; said forward housing section including means for positioning said film unit for exposure; a pair of juxtaposed pressure-applying members mounted within said housing on said rear housing section for applying compressive pressure to said film unit during movement thereof between said members, said pressure-applying members including portions providing a convergent passage between said members; guide means mounted within said housing on said forward housing section adjacent the one of said pressure-applying members located closest said forward housing section for guiding said leading end section into said convergent passage, said guide means cooperating with said one pressure-applying member to provide a guide passage through which said leader is moved between said guide means and said one pressure-applying member forward of said one pressure-applying member toward an opening in said housing adjacent said pressure-applying members on the side thereof opposite said guide means, said guide passage having a width sufficient to admit said leader and insufficient to admit said leading end section; a portion of said rear housing section defining an opening therein disposed to the side of said pressure-applying members opposite said guide means and located in alignment with said convergent passage for permitting withdrawal movement of said film unit between said pressure-applying members from said housing; and portions of said forward and rear housing sections defining a second opening located adjacent and forward of the first-mentioned opening for permitting withdrawal movement of said leader from said housing, said second opening being located between said forward and rear housing sections to permit positioning of said film unit within said housing with said leader extending through said second opening.

22. Photographic apparatus for exposing and processing a photographic film unit which includes a leading end section and an elongated leader which is narrower than said leading end section and is attached thereto at a location thereon spaced from the leading edge of said leading end section toward the opposite end of said film unit, said apparatus comprising, in combination, a housing including forward and rear sections movable relative to one another to permit loading of said film unit into said housing; exposure means mounted on said forward housing section; said forward housing section including means for positioning said film unit for exposure; a pair of juxtaposed pressure-applying members mounted within said housing on said rear housing section for applying compressive pressure to said film unit during movement thereof between said members, said pressure-applying members including portions providing a convergent passage between said members; first guide means mounted within said housing on said forward housing section for guiding said leading end section of said film unit into alignment with said convergent passage; second guide means mounted within said housing and including means located between said first guide means and said pressure-applying members for guiding said leading end section into said convergent passage between said pressure-applying members, and means cooperating with said first guide means to define a guide passage, having a width sufficient to admit said leader and insufficient to admit said leading end section, for guiding said leader around and forward of said pressure-applying members; a portion of said rear housing section defining an opening therein disposed to the side of said pressure-applying members opposite said guide means and located in alignment with said convergent passage for permitting withdrawal movement of said film unit between said pressure-applying members from said housing; and portions of said forward and rear housing sections defining a second opening located adjacent and forward of said first-mentioned opening for permitting withdrawal movement of said leader from said housing, said second opening being located between said forward and rear housing sections to permit loading of said film unit into said housing with said leader extending through said second opening.

23. Photographic apparatus for exposing and processing a photographic film unit which includes a leading end section and an elongated leader which is narrower than said leading end section and is attached thereto at a location thereon spaced from the leading edge of said leading end section toward the opposite end of said film unit, said apparatus comprising, in combination, a housing for enclosing said film unit, said housing including forward and rear sections movable relative to one another to permit loading of a film unit into said housing; exposure means mounted on said forward housing section; said forward housing section including means for positioning said film unit for exposure; a pair of juxtaposed pressure-applying members mounted within said housing on said rear housing section for applying compressive pressure to said film unit during movement thereof between said members, said pressure-applying members including portions providing a convergent passage between said members; first guide means mounted within said housing on said forward housing section for guiding said leading end of said film unit into alignment with said convergent passage; second guide means including a first guide portion mounted on said rear housing section for guiding said leader around and forward of said pressure-applying members to the opposite side thereof from said first guide means, said second guide means including second guide portions cooperating with said first guide portion and said first guide means to define a guide passage, having a width sufficient to admit said leader and insufficient to admit said leading end section, for guiding said leader around said pressure-applying members toward said opposite side thereof; a portion of said rear housing section defining an opening therein located adjacent said pressure-applying members at said opposite side thereof in alignment with said convergent passage for permitting withdrawal movement of said film unit between said pressure-applying members from said housing; and portions of said forward and rear housing sections defining a second opening located adjacent and forward of the first-mentioned opening for permitting withdrawal movement of said leader from said housing, said second opening being located between said forward and rear housing sections to permit loading of said film unit into said housing with said leader extending through said second opening.

24. The photographic apparatus of claim 23 wherein said second guide means includes at least a third guide portion for engaging said leading end section to guide the latter into said convergent passage between said pressure-applying members.

25. The photographic apparatus of claim 24 wherein said second guide portions are mounted on said forward housing section.

26. The photographic apparatus of claim 24 wherein said second guide means are mounted on said rear housing section.

References Cited in the file of this patent
UNITED STATES PATENTS

| | | |
|---|---|---|
| 3,002,437 | Eloranta | Oct. 3, 1961 |
| 3,009,405 | Eburn | Nov. 21, 1961 |